United States Patent [19]
Sampson et al.

[11] Patent Number: 6,058,392
[45] Date of Patent: May 2, 2000

[54] METHOD FOR THE ORGANIZATIONAL INDEXING, STORAGE, AND RETRIEVAL OF DATA ACCORDING TO DATA PATTERN SIGNATURES

[75] Inventors: Wesley C. Sampson, Sylvania, Ohio; Dean Z. Douthat, Ann Arbor, Mich.

[73] Assignee: Wesley C. Sampson Revocable Trust, Sylvania, Ohio

[21] Appl. No.: 09/076,349

[22] Filed: May 12, 1998

Related U.S. Application Data

[63] Continuation-in-part of application No. 08/751,741, Nov. 18, 1996, abandoned.

[51] Int. Cl.⁷ .................................................... G06F 17/30
[52] U.S. Cl. ..................... 707/6; 707/1; 707/7; 707/200; 705/30
[58] Field of Search .............................. 707/6, 1, 7, 200; 705/30; 702/185; 177/178; 395/186; 340/568; 348/419, 340

[56] References Cited

U.S. PATENT DOCUMENTS

| | | | |
|---|---|---|---|
| 5,212,639 | 5/1993 | Sampson et al. | 364/419 |
| 5,390,113 | 2/1995 | Sampson | 364/419 |
| 5,557,742 | 9/1996 | Smaha et al. | 395/186 |

OTHER PUBLICATIONS

Getting Started With Patterns, Luke Hohmann, *Software Development*, Feb. 1998 (pp.55–61).
An Innovation in Auditing—Matrix Summaries of Journal Entries, Wesley C. Sampson and Michael J. Olan, ABACUS, vol. 28, No. 2, Sep. 1992 (pp. 133–141).
The Grid File: An Adaptable, Symmetric Multikey File Structure, J. Nievergelt and H. Hinterberger, *ACM Transactions on Database Systems*, vol. 9, No. 1, Mar., 1984, (pp.38–71).
Multi–Attribute Retrieval with Combined Indexes, V.Y. Lum, *Communications of the ACM*, vol. 13, No. 11, Nov., 1970 (pp. 660–665).
Transaction Index: A Tool for Auditors, Wesley C. Sampson, *Internal Auditing*, Spring, 1996 (pp.16–24).
Why Decision Support FAILS and How to FIX It, Ralph Kimball and Kevin Strehlo, *Datamation*, Jun. 1, 1994 pp. 40–45).
Matrix Auditor Users Manual. pp. 1–10 (No Date).
Sparse Sort Users Manual. pp. 1–13 (No Date).

*Primary Examiner*—Thomas G. Black
*Assistant Examiner*—Diane D. Mizrahi
*Attorney, Agent, or Firm*—Daniel A. Roseberg; Kent A. Herink; Davis, Brown, Koehn, Shors & Roberts, P.C.

[57] ABSTRACT

A computer control program directs a method whereby a computer reads a data entry record group from a data stream, wherein the data entry record group comprises one or more data entry records containing a key field containing an item. A key number representing the total number of key fields in the data entry record group is tallied, and a marker that allows for locating, and determining the size of, the data entry record group within the stream of data is recorded. The computer converts each item of the data entry record group to fixed length coded equivalence called an item indicator, and converts the item indicators to a fixed length coded equivalence called a signature. The computer creates a partial index record for each signature, and updates a combination cross-reference file and a raw data index, thereby classifying the data to allow for subsequent searching by persistent fast search methods.

16 Claims, 4 Drawing Sheets

FIG. 4c

RAW DATA INDEX

| SIGNATURE 1 | MARKER 1 |
|---|---|
| SIGNATURE 2 | MARKER 2 |
| ⋮ | ⋮ |
| SIGNATURE N | MARKER N |

86 — SIGNATURE column
98 — MARKER column

FIG. 4d

MASTER LIST

MASTER LIST [ITEM INDICATOR 1] = ITEM 1

MASTER LIST [ITEM INDICATOR N] = ITEM N

92 — ITEM INDICATOR
80 — ITEM

FIG. 4e

INVERTED COMBINATION CROSS-REFERENCE FILE

| ITEM INDICATOR 1 | SIGNATURE 1 | RELATED DATA 1 |
|---|---|---|
| ITEM INDICATOR 1 | SIGNATURE 4 | RELATED DATA 1 |
| ITEM INDICATOR 1 | SIGNATURE 7 | RELATED DATA 1 |
| ITEM INDICATOR 2 | SIGNATURE 4 | RELATED DATA 1 |
| ITEM INDICATOR 2 | SIGNATURE 8 | RELATED DATA 2 |
| ITEM INDICATOR 3 | SIGNATURE 1 | RELATED DATA 3 |
| ITEM INDICATOR 4 | SIGNATURE 2 | RELATED DATA 4 |
| ⋮ | ⋮ | ⋮ |
| ITEM INDICATOR N | SIGNATURE M | RELATED DATA N |
| ITEM INDICATOR N | SIGNATURE L | RELATED DATA N |

92 — ITEM INDICATOR column
86 — SIGNATURE column
96 — RELATED DATA column 6,058,392

METHOD FOR THE ORGANIZATIONAL INDEXING, STORAGE, AND RETRIEVAL OF DATA ACCORDING TO DATA PATTERN SIGNATURES

RELATED APPLICATION

This application is a continuation-in-part of U.S. patent application Ser. No. 08/751,741 filed Nov. 18, 1996 now abandoned entitled METHOD AND APPARATUS FOR CLASSIFYING RAW DATA ENTRIES ACCORDING TO DATA PATTERNS.

BACKGROUND OF THE INVENTION

The present invention relates generally to a method for the organizational indexing, storage, and retrieval of data, and more particularly, to a method of organizational indexing, storage, and retrieval of data wherein a data entry record group, comprising one or more items, is read from a stream of data, item indicators are created from the items and a signature is created from the item indicators for the purpose of indexing.

Many enterprises generate large volumes of information for computerized storage, retrieval, and analysis. Generally, a computer reads the information, or data entries, from a data stream record by record. Each record contains a varying number of items of information. A particular record can contain one item, or several hundred or more individual items. The records, therefore, not only vary in length, but the individual items can vary in length. Usually, the computerized management of data involves storage of the data on a mass storage device like a magnetic disk. This allows later retrieval of the data for analysis. For example, when a receiving department of a business receives a delivery of inventory parts, a computerized record of the event or transaction captures the event. The data record associated with the event or transaction can involve a number of items of information, like the quantity of parts received, the part numbers, the date, and the like. Obviously, a computer can collect a huge amount of information very quickly, therefore, timely and accurate retrieval of the data requires a good indexing system.

Prior art indexes are described as primary vs. secondary, where primary indexes are ordered by the same key as the file but secondary indexes refer to a different attribute of the file record. A dense index identifies every record of the file whereas a sparse index identifies logical sections. A single-level index points directly to the location of the content whereas a multi-level index accommodates further subdivision of the index at each level, the final level pointing to the location of the content. Static indexes are not changed in the normal operation whereas dynamic indexes are expected to be altered while an operation is in execution. Regardless of the method of index, the target of the index reference is always one specific item. That one specific item may be a specific record, the first occurrence of a specific value of a given field, the disk sector on which the data is found, or something else of a singular definition. The target is usually defined on (directed to the index from) individual field(s) of a single record.

Nievergelt, Hinterburger and Sevcik (ACM Transactions on Database Systems, March, 1984) surveyed combinatorial indexes. However, their work covered multi-attribute combinations and disclaimed the study of multiple values of a single data attribute in an index, the method used in the present invention.

Additionally, U.S. Pat. No. 5,212,639 shows a method and electronic apparatus for the classification of combinatorial data for the summarization and/or tabulation thereof. The apparatus and the method create a database wherein the data entry, such as a journal entry in accounting, comprises the canonical record. A plurality of data entries to be classified are separate records, each comprised of one or more items having associated quantities and an entry identifier serving as a pointer to the record. Each item contains information including at least an item number, or label, and a quantity. A mapping function is applied to each data entry to assign item indicators for the item numbers paired with the associated quantities. The item indicators for the data entries are sorted into ascending numerical sequence and an n-dimension sparse matrix is selected where "n" is the number of items in the data entry. If the present combination of item indicators is new, a design record is created for the database based upon the sparse matrix and including the item indicators, the associated quantity sums, the total number of data entries summarized in the design record and a pointer (a chain of entry identifiers) to the records of the data entry detail. The quantities for the present data entry are added to the quantity sums and the entry identifier is stored in the pointer chain. After all the data entries have been processed, a search routine can be utilized to review the various design records as desired.

This reference, however, does not teach the utilization of a key number representing the total number of key fields, or items, in the data entry record groups. By utilizing a key number, it is possible to, for example, minimize the amount of memory needed to ultimately store the information. Additionally, the reference teaches the use of pointers chains to navigate through the index. Pointer chains eventually breakdown when dealing with very large amounts of data. With large amounts of data the size of the pointer chain grows to an excessive level, and stepping through a very long pointer chain requires significant amount of processing time. Further, when the pointer chains become large they require a large amount of Random Access Memory storage, which places further demands on the computer system and computer processing time. Also, the pointer chains requiring updating and storage each time a new record is added to the chain. Again with the growth in the size of the pointer chains, this increases system processing time. Furthermore, pointer chains can make error recovery difficult, if one link in the pointer chain fails then processing stops and must resume at the beginning of the pointer chain. Furthermore, the reference teaches separately processing variable length data entry record groups. The reference teaches the maintenance of separate pointer chains for each variable length data entry record group. Thus, all the data entry record groups comprised of two items require separate processing from the data entry record groups comprised of three items. Consequently, the method taught by the reference is more effective when implemented to audit existing fixed length data, rather than to perform real-time management of variable length data.

Furthermore, U.S. Pat. No. 5,390,113 shows a method and electronic apparatus for electronically performing bookkeeping upon a plurality of pre-existing accounting journal entries having at least one account number and at least one data component associated with each account number. First, a chart of accounts having account numbers and opening balances associated with the plurality of journal entries is read electronically. A set of account-section numbers is then created for each account number. The journal entries are electronically read individually and one of the account-section numbers is assigned to each account number. The assigned account-section numbers and associated data components are then sorted in a predetermined order. A design for the predetermined order is identified and compared with stored design records to see if such a design already exists. If not, the new design is stored. If so, the associated data components are added to the accumulated total for each account-section number. A tally representing the number of journal entries summarized is increased by one and an entry identifier is added to a list of data entry record groups. The process is then repeated for each journal entry. This reference also fails to teach the utilization of a key number representing the total number of key fields in the data entry records group. The key number allows for quickly identifying data entry record groups of common size. Without the key number, sorting requires traversing all of the design records regardless of their size. Further, this reference also relies extensively on pointer chains, and requires separate processing for each variably sized data entry record group. Accordingly, the teachings of the reference are more effective when implemented to perform bookkeeping of existing data rather than to perform real-time management of variable length data.

Moreover, U.S. patent application Ser. No. 08/751,741 now pending teaches a method and apparatus for the classification of raw data based on the creation of an index. The method comprises reading a data entry record group from a plurality of data entry record groups, where the data entry record group comprises at least one data entry record with at least one key field containing an item. The method further comprises tallying a key number representing a total number of key fields in the data entry record group, creating an index record having a predetermined number of one or more key fields equal to the key number, mapping each item in the key fields of the data entry record groups to generate an item indicator in each of the key fields of the index record, and determining whether each of the item indicators in each of the key fields of the index record exists in a stored index record. If the item indicators in each of the key fields of the index record do not exist in the stored index record, the item indicators are added to the index record along with a pointer enabling location of the data entry records group, and the index record is stored. If the item indicators in each of the key fields of the index record exist in the stored index record, a pointer scheme related to the stored index record is altered to enable location of the data entry record groups. This method again relies on pointer chains to traverse the variable length index records, and of course, suffers from the other aforementioned difficulties. Additionally, this method also requires a key number to allow quick identification of variable size records. Thus, each variable length group of records requires a separate indexing system. Accordingly, the teachings of this reference operate more effectively when implemented upon smaller data sets.

The present invention substantially eliminates the difficulties encountered in the prior art discussed hereinabove.

SUMMARY OF THE INVENTION

An object of the present invention comprises providing a method to index data representing real life events.

Another object of the present invention comprises providing a method to index data according to historical records of activity located within the data in the form of data patterns.

A further object of the present invention comprises providing a method to index data according to items appearing within the data.

An additional object of the present invention comprises providing a method to create a fixed length index of data from variable length records.

These and other objects of the present invention will become apparent to those skilled in the art upon reference to the following specification, drawings, and claims.

The present invention intends to overcome the difficulties encountered heretofore. To that end, the present invention comprises a computerized method for organizational indexing, storage, and retrieval of a computerized representation of events in the form of data, by creating signatures based upon the occurrence of patterns within the data. The method comprises reading data entry record groups from a stream of data. The data entry record group is a computerized representation of a real world event, and comprises at least one data entry record having a key field containing an item. A key number is tallied wherein the key number equals the total number of key fields within a given data entry record group. A marker representing the location and size of the data entry record group within the stream of data is recorded. Each item within the data entry record group is converted to a fixed length coded equivalence, thereby creating an item indicator for each of the items within the data entry record group. A signature for the data entry record group is created by converting all of the items indicators of the data entry record group into a fixed length coded equivalence. If the signature represents a new grouping of item indicators then a partial index record is created comprising the signature and the key number. A combination cross-reference file is updated such that the combination cross-reference file comprises a record for each item indicator found within the data entry record group. Each of the records of the combination cross-reference file comprise a signature and an item indicator from that signature. A raw data index is updated with the marker, and the signature of each data entry record group.

BRIEF DESCRIPTION OF THE DRAWINGS

FIG. 4b shows a representation of a combination cross-reference file.

FIG. 4c shows a representation of a raw data index.

FIG. 4d shows a representation of a master list.

FIG. 4e shows an inverted cross-reference file; and

DETAILED DESCRIPTION OF THE INVENTION

Figure 1:
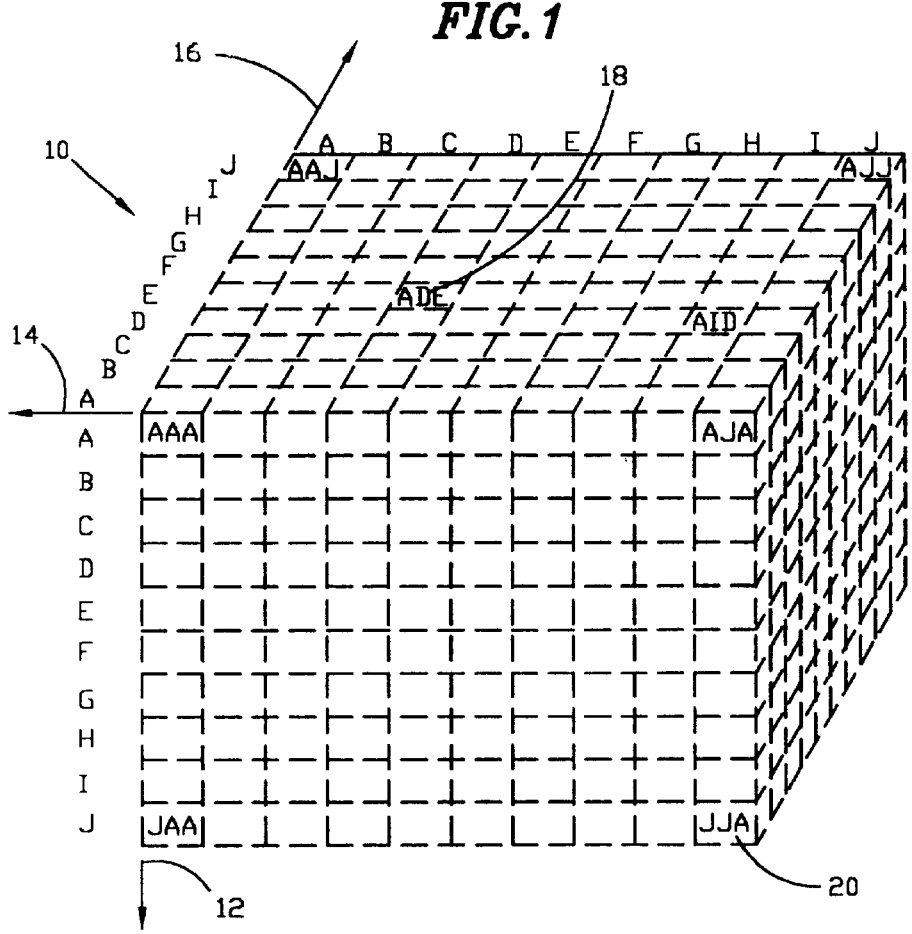
FIG. 1 shows a conceptual representation of a three dimensional matrix.

The present invention utilizes the ensuing definitions throughout.

DATA PATTERN—a historical record of activity located within a set of data.

EVENT—a transaction, case, occurrence, episode, or the like, capable of computerized representation in the from of a logged data record. The event comprises the real life transaction, case, occurrence, episode, or the like, that is captured in a particular form for computerized processing.

DATA ENTRY RECORD (KEY FIELD)—a computerized representation of each fundamental unit of information within an event in the form of one line of data in a file or list. The computerized representation of the real world event always contains at least one unit of information, and usually contains more than one. The computerized representation of the event begins with identifying the data entry record(s) within the event.

ITEM (KEY FIELD VALUE)—a variable length computerized representation of each fundamental unit of information of an event found in the data entry record.

ITEM INDICATOR—a fixed length coded equivalence of an item.

DATA ENTRY RECORD GROUP—the computerized representation of an event, or all the data entry records of a particular event. Note that individual data entry record groups may contain not only different key field values, but a different number of key fields (that is the data entry record group is a variable length record). A MARKER allows for locating and determining the size of the data entry record group within the stream of data.

KEY NUMBER—the number of key fields within a data entry record group.

SIGNATURE—a fixed length coded equivalence of the item indicators of each unique data entry record group. The signature represents a unique event, occurrence, transaction, or the like, and in this manner the signature captures in a fixed length record a data pattern, that emerges from the data.

INDEX RECORD—each index record represents a unique data entry record group. Thus, one index record is created even for data entry record groups that occur more than once. Further, individual index records can vary in length depending on the key number associated with the underlying data entry record group. The index record contains information that allows recovery of each data entry record group, and each data entry record within a given data entry record group. In this manner, each index record represents a pattern of usage of master list items.

PARTIAL INDEX RECORD—each partial index record represents a signature which occurs within the universe of data entry record group signatures, along with the key number for the data entry record group which the signature represents, and preferably a count. The count comprises the total number of occurrences of the data entry record group within the data set.

COMBINATION CROSS REFERENCE FILE—additions are made to this file whenever a new signature is encountered. A record is added for each item indicator in the new signature. Each new record of the index must contain both the identifying signature and one item indicator. The index is searchable by signature to find the specific combination of item indicators, or searchable by item indicator to determine which signatures contain the item indicator. Optionally related data may be included in each record.

RAW DATA INDEX—the raw data index contains a record for every single data entry record group. The record consists of the signature of the data entry record group, and the marker. Thus, once a signature is identified all of the raw data associated with that signature is locatable.

MASTER LIST—an array of all possible key field values in which the associated item indicators serve as the array subscripts. The key field values are used as SORTKEYS to enable recovery of data.

In accordance with the above definitions, the following example will prove useful in illustrating the method of classification of data contemplated by the present invention. Those skilled in the art, however, will realize that the practice of the present invention is by no mean limited by, or to, the following example. The present invention is readily adaptable to the classification of data derived from a virtually unlimited array of sources.

Consider the activities taking place in a modem grocery store. Stores of this type typically contain a number of check out lines, each with a cash register for recording the purchases of individual consumers. A central computerized data collection device can collect the flow of information from the array of individual cash registers. In this manner, the grocery store can capture in computerized form data which represents the operation of the grocery store. The real life events, or transactions, that take place at the grocery store comprise the purchase of items of inventory by customers of the store. Each time the cash register records the purchase of items of inventory by a customer a real life event is converted into a computerized representation of that event. In a similar manner, the posting of financial transactions in an accounting journal could comprise an event, commonly called a transaction. Or, the stay of a patient at a hospital could comprise an event, commonly called a case or episode. Some events have already been summarized, typically hospital episode records fall into this category. Again, these examples constitute merely illustrative instances of possible events applicable to the methods of the present invention, and do not intend in any manner to limit the application of the present invention.

Referring again to the grocery store example, the purchases of an individual customer comprises an event, and this event occurs over and over again in the ordinary operation of the grocery store. Each individual event further comprises a number of fundamental units of information called key fields. Consider a first event, or transaction, wherein Customer A purchases three items of inventory—cereal, milk, and sugar. The first event comprises three key fields each with a unique value. The first key field of the first event contains the key field value of "cereal," the second key field of the first event contains the key field value of "milk," and the third key field of the first event contains the key field value of "sugar." Next, if Customer B purchases two items of inventory—bread and milk, the first key field of the second event contains the key field value of "bread," and the second key field of the second event contains the key field value of "milk."

Computerized representation of the aforementioned events comprises converting the events, and the associated key field values, into computer data records. The canonical record comprises the data entry record group. Each data entry record stores each fumndamental unit of information in the event, in the form of an item. Thus, a data entry record is created for each key field of each event, and the key field value becomes the item of the data entry record. In the grocery store example each line of the cash register receipt tape comprises a data entry record. The data entry record group that represents Customer A's purchases comprises three data entry records, one for each key field. The first data entry record of the first data entry record group comprises the item "cereal," the second data entry record of the first data entry record group comprises the item "milk," and the third data entry record of the first data entry record group comprises the item "sugar." In turn, the data entry record group that represents Customer B's purchases comprises only two data entry records.

Again, each purchase of a particular customer comprises an event. The computerized representation of that event comprises a data entry record group. Thus, the data entry record group comprises the entire set of all of the data entry records for a given event. The data entry record group for Customer A's purchases comprise three data entry records, one for each item of inventory purchased. The data entry record group for Customer B's purchases comprises only two data entry records. The total number of data entry records within a data entry record group equals a key number or tally. In reference to Customer A's purchases the key number or tally equals three, and the key number or tally equals two for Customer B's purchases.

One problem that the grocery store example highlights involves the fact that the key number, or tally, varies among the data entry record groups. Taking full advantage of the search features of the various fast search methods contemplated for use in the present invention requires converting the variable length data entry record groups to fixed length coded equivalencies. The present invention utilizes a minimal perfect hash function, and a signature function both well known in the art, to accomplish this task. Both the signature function and the minimal perfect hash function map an input value of variable length to an output value of fixed length, for example the output typically comprises a binary number. Of course, those skilled in the art will realize that any algorithm that performs one-to-one mapping and converts a variable length input value to a fixed length output value can perform the above conversion. In the end, application of the minimal perfect hash function results in creation of item indicators, and application of the signature function results in the creation of a signature, a more detailed description of these methods follows below.

Accordingly, Customer A's purchases calculate to a first signature and Customer B's purchases calculate to a second signature. In this manner, each unique combination of key field values, or items in a data entry record group, would produce a unique signature. Further, the data representing purchases identical to Customer A's purchases will produce the identical signature. Several customers could easily purchase cereal, milk, and sugar. This purchase, therefore, represents a unique signature representative of a data pattern, which can occur numerous times. Each unique combination of key field values from a data entry record group, is compiled into an index record. Thus, the purchases of Customer A comprise a unique combination of key field values and this combination comprises a first index record. Likewise, the purchases of Customer B comprise a second unique combination of key field values and, therefore, a second index record.

In general, computerized representations of events in the form of data proves most useful if classified in a method that allows for quick retrieval of the information based on the occurrence of certain patterns within the data. An ideal framework for a classification scheme of N events entails the creation of N data entry record groups. Further, assume that each of the N data entry record groups contains M key fields. Additionally, assume that the N data entry record groups each with M key fields, contain exactly L unique key field values. Thus, the master list contains L items, and the key number for each data entry record group equals M. Classification of this data requires a M dimensional array, with each dimension of the array of length L. The array can store $L^M$ values. Not all of the key field groupings, however, may occur within the N data entry record groups. This allows the use of a sparse matrix, which allocates space for only those key field groupings that actually occur.

FIG. 1 shows a matrix 10 for storing the data representing the occurrence of the N events. For the purpose of illustration, the matrix 10 stores data from N events where each of the N data entry record groups comprises three key fields, and the total number of key fields equals ten. The letters A–J represent the ten key field values. Matrix 10, therefore, comprises a 3-dimensional array with each of the ten key field values arranged along the three axes 12, 14, 16 of the matrix 10. In this manner, locating the data entry record group with any particular grouping of key field values only requires using those key field values to index the cell of matrix 10. For example, cell 18 stores the data entry record group with key field values A, D, and E. In a similar manner, cell 20 stores the data entry record group with key field values J, J, and A. Consequently, matrix 10 can store all 1000 unique permutations of key field values, and their associated data entry record groups.

In particular, matrix 10 actually only stores 8 key field values (AAA, JAA, JJA, AJJ, AAJ, ADE, and AID). In some applications, primarily scientific, the exact ordering of the key field values requires preservation. In this case the matrix 10 stores all the permutations of key field values. In other applications, however, only the key field combinations require preservation. In that case the 8 key field values shown in FIG. 1 reduce to 4 key field values (A, ADE, ADI, and AJ).

Figure 2A:
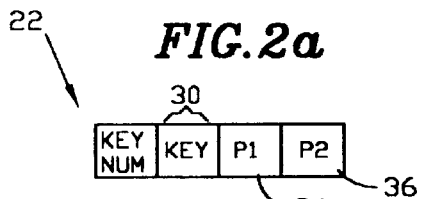
FIG. 2a shows a representations of an index record with one key field.
Figure 2B:
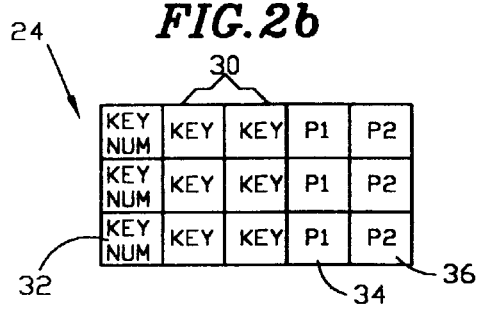
FIG. 2b shows a representations of an index record with two key fields.
Figure 2C:
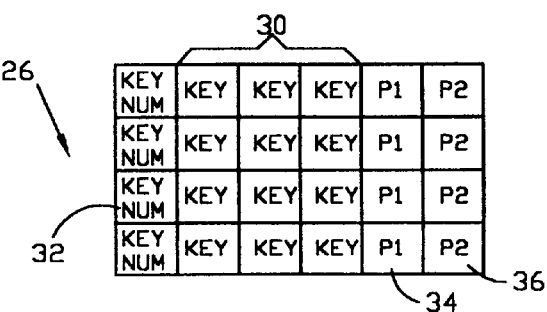
FIG. 2c shows a representations of an index record with three key fields.
Figure 2D:
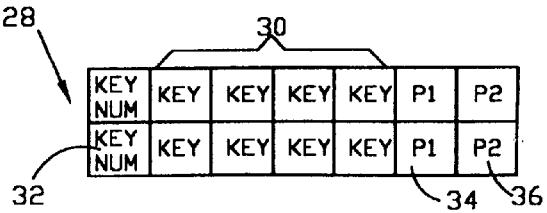
FIG. 2d shows a representations of an index record with four key fields.

Reality differs from the situation depicted by matrix 10 in that the data entry record groups vary in size. In other words, the key number or tally for the data entry record groups representing a particular data set will vary. This requires a different conceptual approach. FIGS. 2a–d shows several groupings of index records 22, 24, 26, 28 of varying size. Each grouping of index records 22, 24, 26, 28 contains a variable length portion 30 which consists of one or more key fields each containing a key field value. The key field values derive from a master list of key field items, which contains all of the possible key field values for a given data set. FIG. 2a. shows the variable length record portion 30 of a grouping of index records 22 consisting of a single key field. Therefore, index record grouping 22 comprises a one-dimensional index record. In an identical manner, the variable length record portions 30 of the grouping of index records 24 shown in FIG. 2b each include two key fields. Therefore, this grouping of index records 24 comprise two-dimensional index records. Likewise, the variable length record portions 30 of the grouping of index records 26 shown in FIG. 2c each include three key fields. This grouping of index records 26 comprise three-dimensional index records. Additionally, the variable length record portions 30 of the grouping of index records 28 shown in FIG. 2d each include four key fields. Therefore, this grouping of index records 28 comprise four-dimensional index records.

Each of the index records depicted in FIGS. 2a–d contain a key number 32 equal to the number of key fields in the particular record. Thus, the key number 32 for the grouping of index records 24, shown in FIG. 2b, equals 2. The key number 32 for the grouping of index records 28, shown in FIG. 2d, equals 4. Additionally, as shown in FIGS. 2a–2d, each grouping of index records 22, 24, 26, 28 includes a P1 pointer 34, and a P2 pointer 36. The P1 pointer 34 can point to the raw data with that particular combination of key field values. Furthermore, the P2 pointer 36 may point to additional information.

The index records depicted in FIGS. 2a–d suffer from a couple of significant drawbacks. First, the index records vary in length. This prevents modem fast search methods from processing all of the variable length index records at the same time. Thus, searching for a particular key field value or a combination of key field values, that appears anywhere in the data, will require separately processing variable sized index record groupings 22, 24, 26, 28. Second, the use of pointer chains to locate all of the particular data entry records represented by the key field combination of a given index record 22, 24, 26, 28 proves cumbersome. The pointer chains degenerate with size, and, therefore, do not work well with large amounts of data. Despite these aforementioned drawbacks, the index record approach shown in FIGS. 2a–d still proves useful to the method of the present invention.

Figure 3:
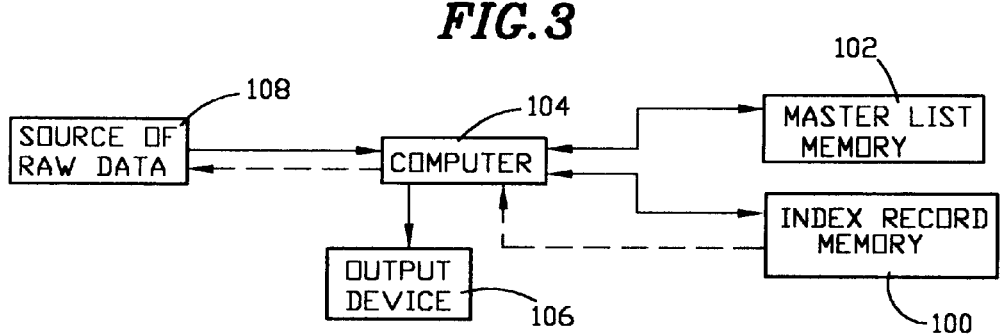
FIG. 3 shows a block diagram of the apparatus of the present invention.

In FIG. 3, there is shown a block diagram of an apparatus for performing the method of creating the indexes of the present invention. A source of raw data 108, such as another computer program or data transmission from another computer or peripheral data source, has an output connected to an input of a computer 104. The source 108 may include a master list of items in key fields of the information being processed. The computer 104 reads the master list and stores the master list information in a master list memory device 102 connected to the computer 104. If the master list is not present in the source 108, the computer 104 may create and store the master list. Once the master list has been stored, the computer 104 does not have to read the master list each time additional raw data containing items from the master list is to be processed.

The computer 104 reads the raw data from the data source 108. The computer 104 can identify the unique set of items associated with the raw data, and create the indexes of the present invention. The indexes are stored in an index record memory 100 connected to the computer 104. An output device 106, such as a printer or a CRT, also is connected to the computer 104 for generating output information related to the index. The hardware associated with this method may consist of portions of an existing computer program, as a separate computer system, or as a small computer installed in the circuitry of a larger computer.

Figure 5:
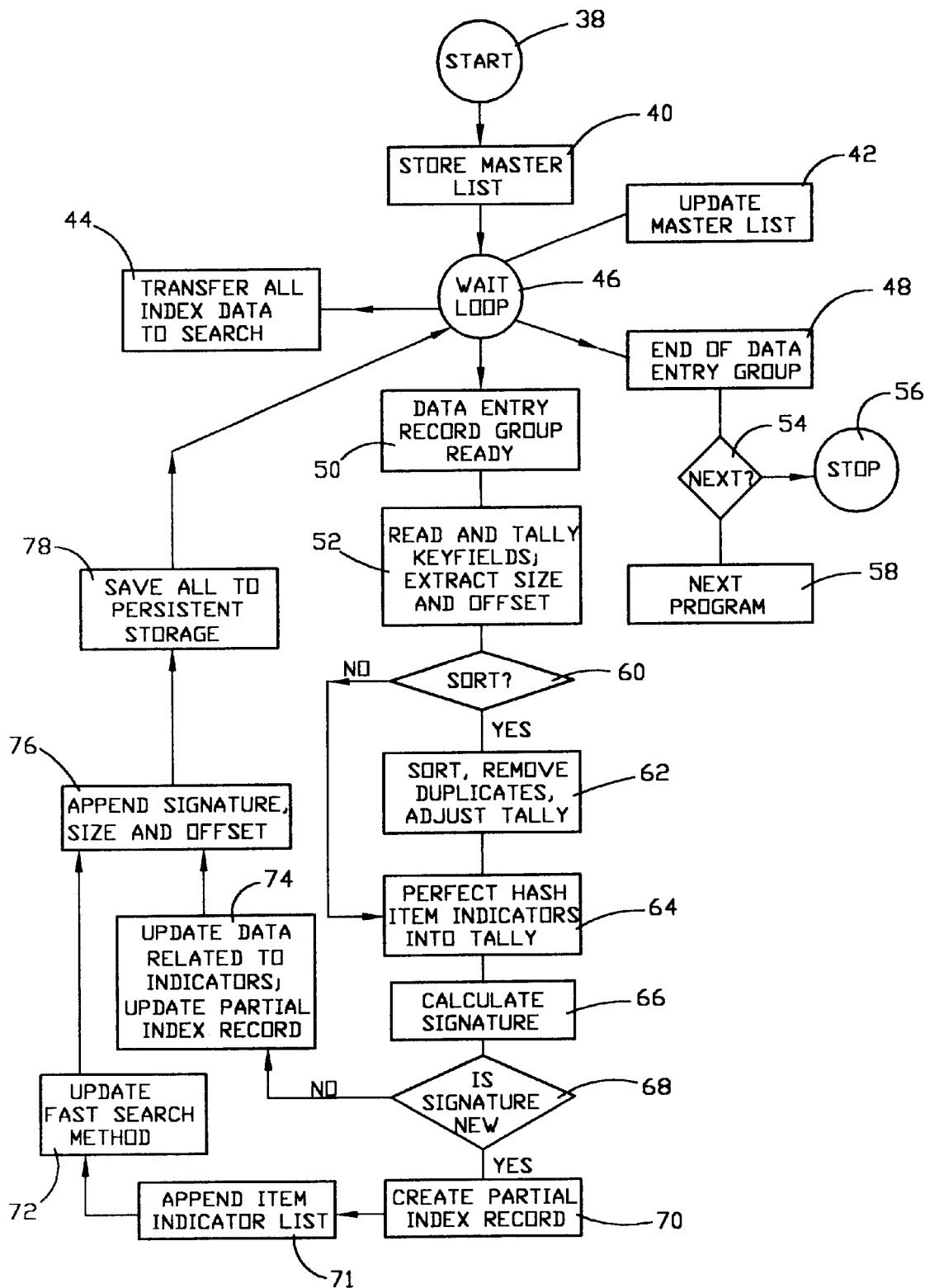
FIG. 5 is a flow chart depicting a method of data classification.

The preferred embodiment of the present invention, while continuing to take advantage of both the index record approach, and the ideal data classification method, involves the following modifications. In particular, FIG. 5 shows the method of data classification of the present invention embodied in the following steps.

The computer 104 performs the steps of the method of the present invention under the control of a computer controlled program means located within the computer 104. Referring to FIG. 5, the method of the present invention begins with the start step 38, and then proceeds to the store master list step 40. In the store master list step 40 the master list, which comprises a list of all possible key field values that could appear in the indexes, is stored to memory for later use. FIG. 4d shows a representation of the records of the master list. Each record of the master list contains at least an item 80, and the associated item indicator 92 of the item 80 performs as the master list subscript. The item 80 represents a key field value taken from a data entry record of a data entry record group. Each individual item 80 is then converted to a corresponding item indicator 92 through application of a minimal perfect hash function. The minimal perfect hash function converts the item 80 into a fixed length coded equivalent of the item 80, represented by the item indicator 92. In this manner, each item 80 in the master list maps to a unique fixed length binary coded equivalent item indicator 92. The master list contains at least a listing of all of the items 80 which could possibly appear within a given data set. Upon construction of the indexes of the present invention, the items 80 of the master list function as search sort keys and can be located within the master list through use of the item indicator 92 subscripts. The sort keys will enable selection of items 80 from the master list to allow generating readable reports of searches.

Next, program control passes to the wait loop step 46. At this point program control can branch to either the update master list step 42, or to the end of data entry record groups step 48, or to the data entry record group ready step 50, or to the transfer all index data to search step 44. Following program control to the data entry record group ready step 50, begins the process of constructing the indexes of the present invention. The first step in this process consists of the read and tally key fields step 52. In this step the computer reads raw data from a logged data record source 108, wherein the data comprises the computerized representation of events, transactions, cases, occurrences, episodes, or the like. However, the computer can read summaries from pervious data entry record groups, where the summaries originally came from separate data streams. The read and tally key field step 52 is performed on one logged record of the data source 108 at a time. The computer reads the data from the raw data source 108 one event at a time. The events recorded on the raw data source 108 comprise at least one key field with a key field value, and in most cases comprise a number of key fields. Thus, in the read and tally key field step 52 the computer reads one data entry record group which represents an event from the data stream. Further, each data entry record group comprises one or more data entry records. Each data entry record further comprises a key field containing an item 80. Also, a key number representing the total number of key fields within the data entry record group is tallied. Additionally, a marker which allows for locating, and determining the size of, the data entry record group within the data stream is also recorded.

Next, program control passes to the sort decision step 60. In the sort decision step 60 the computer controlled method determines whether to sort the items 80 contained within the key fields of the data entry record group. For indexing purposes in business or social science applications, the order and/or the number of times which an item 80 appears in the data entry record group usually is not important. For example, in the context of the grocery store, the data entry record group representing the purchases of Customer A includes three key fields containing the items 80 "cereal," "milk," and "sugar." In this application the exact order of the purchases appearing in the data entry record group representing the purchases of Customer A would not matter for the purposes of indexing. Further, suppose that customer A purchased a fourth item 80 consisting of a second carton of milk. The data entry record group representing customer A's purchases would include four key fields but only three unique items 80. In many applications it is only necessary to record the unique items 80, and thus the duplicate purchase of milk would not comprise part of the data entry record group for the purposes of indexing. Additionally, in many applications the order of the items 80 appearing in the key fields of a data entry record group typically occurs in a predetermined manner. For the purpose of consistency, or for matters of convenience, many businesses and enterprises typically deal with items 80 in a predetermined sequence and manner. For example, in descending or ascending alphabetical order. For these applications and purposes sorting the items 80 of the key fields of the data entry record group into a predetermined sequence and eliminating duplicate items 80 comprise useful tasks.

In these situations program control branches from the sort decision step 60 to the sort, remove duplicates, adjust tally step 62. In this step the items 80 of the data entry record groups are sorted, duplicates are removed, and the key number representing the total number of key fields in the data entry record group is adjusted to reflect the removal of any duplicate items 80. Then program control branches to the perfect hash item indicators step 64.

In other applications the specific order in which the items of the data entry record group appear requires preservation. Typically scientific applications fall into this category. For example, if the items 80 of the data entry record group represented the molecular structure of a particular composition of matter, sorting the key fields would result in the loss of critical information. Furthermore, removing duplicates would also destroy important information. In a situation like this, program control would transfer from the sort decision step 60 to the perfect hash item indicators step 64.

In the perfect hash item indicators step 64 the minimal perfect hash function converts the items 80 of the data entry record group into item indicators 92, or unique fixed length coded equivalencies. In this manner, the item indicators 92 typically comprise a binary number. Next, program control transfers to the calculate signature step 66. In this step a signature function is applied to the complete array of item indicators created in the perfect hash item indicator step 64. This application of the signature function results in the creation of a signature 86 for that particular data entry record group. The signature function comprises a hash function, or similar function, in which minor differences in input produce major differences in output. The signature function produces a fixed length coded equivalence, usually in the form of a binary number. Next, program control transfers to the signature new step 68.

Figure 4A:
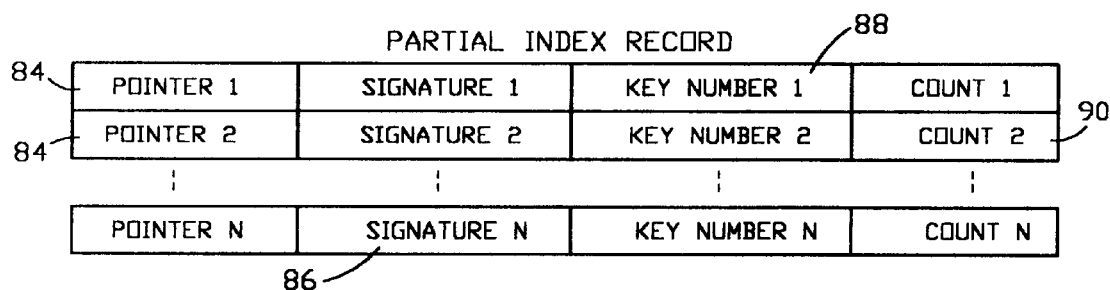
FIG. 4a shows a representation of a group of partial index records.

In this step, the computer searches for any prior occurrences of the just created signature 86. If this instance of the signature 86 comprises the first occurrence of the signature 86, program control transfers to the create partial index record step 70. FIG. 4*a* shows a representation of the individual records of the partial index record. One record of the partial index record includes a signature 86, a key number 88, and a pointer 84. Additionally, the partial index record can include a count 90. Since the presently created signature 86 does not exist in any of the partial index records, the computer appends a new record onto the partial index record containing the new signature 86, the key number 88 representing the total number of key fields within the data entry record group, and a pointer 84 that points to the first record within a combination cross-reference file that contains the same signature 86. Additionally, the partial index record can contain a count 90. The count 90 represents the number of occurrences of that particular signature 86 within the overall data stream. Also during the create partial index record step 70 the signature 86 and a marker 98, which allows for locating and determining the size of, the data entry record within the data stream, are recorded for subsequent use by a persistent fast search method.

Next, program control transfers to the append item indicator list step 71. In the append item indicator list step 71 a record is added to the combination cross reference file shown in FIG. 4*b*. The combination cross reference file includes the item indicator 92, the signature 86, and any related data 96. For example, if a first signature 86 results from application of the signature function to the first four item indicators 92 shown in FIG. 4*c* the combination cross reference file would contain four records for the first signature 86. If a second signature 86 resulted from the application of the signature function to the next three item indicators 92 shown in FIG. 4*b*, the combination cross reference file would contain three records for that second signature 86. In this manner, the combination cross reference file would contain a record for every occurrence of an item indicator 92 within every signature 86 occurring within the data stream.

Following this step, program control transfers to the update fast search method step 72. In this step information is inserted into the persistent fast search method for subsequent use in searching the indexes. The information inserted includes at least the signature 86 and a means for locating the first occurrence of the signature 86 in the partial index record. The means could comprise a pointer, or other similar devices.

Returning now to the signature new step 68, if the signature 86 is not new then program control transfers to the update data related to indicators and update partial index record step 74. In this step, if the combination cross reference file does contain any related data 96 for the particular signature 86 then the related data 96 is added to previous related data 96 of the appropriate item indicators 92 of that particular signature 86. The related data 96 can comprise virtually any data attribute of significance to the particular item indicators 92 of the signature 86. For example, the related data 96 could include the date and time, a name of an individual associated with the particular item 80 that the item indicator 92 represents, the number of duplicate items 80 removed in the sort, remove duplicates, adjust tally step 62 or any other similar type of information. In an alternative embodiment high and/or low values and other information can be appended to the partial index record. Additionally, if the signature 86 is not new then the count 90 associated with the particular signature 86 requires incrementing. In other words, since each signature 86 appears only once in the partial index record, the count 90 records the number of data entry record groups with that particular signature 86. Thus every time a signature 86 reappears the count 90 requires incrementing to accurately reflect the total number of occurrences of each signature 86 within the data stream.

The next step in the method comprises the append signature, and marker step 76. In this step, a record is appended to a raw data index shown in FIG. 4*c*. Each record in the raw data index includes the signature 86, and the marker 98. In this manner, the raw data index captures the occurrence of every data entry record group, and the size and location of the data entry record group represented by the marker 98.

Next, computer program control passes to the save all to persistent storage step 78. In this step all of the aforementioned indexes are saved to an index record memory 100, shown in FIG. 3. Program control then passes to the wait loop 46. In the situation where the master list does not already exist in persistent memory, program control transfers to the update master list step 42. In this step, any new items 80 and item indicators 92, within the data entry record group just processed, are appended to the master list. In this manner, the master list always contains at least all of the items 80 and item indicators 92 appearing in the data stream. On the other hand, program control could return to the data entry record group ready step 50 for processing the next data entry record group within the data stream. After processing all of the data entry record groups within the data stream, program control could transfer from the wait loop 46 to the end of data entry record groups step 48. At this point program control transfers to the next step 54, at which point computer control either branches to the stop step 56 or to the next program step 58. Finally, computer program control can branch from the wait loop 46 to the transfer all index data to search step 44. The transfer all index data to search step 44 signifies the end of the load phase and the beginning of the search phase of the present invention.

In the search phase conventional public domain persistent fast search methods can operate upon the indexes created in the load phase to compile reports, identify the existence of particular conditions within the data, or any number of operations based on index searching. Those skilled in the art will realize that the search phase can utilize several distinct fast search methods including B+ Tree, or ISAM. ISAM comprises a public domain method for finding computerized information that utilizes an indexing system to sequentially order the data to conventionally point to a specific area within the data based on a predetermined criteria. The configuration of indexes created during the load phase enables data pattern searching based on the fixed length signatures 86 and the fixed length item indicators 92. In this manner, the indexes convert the variable length data entry record groups to fixed length records within the partial index record, the combination cross reference file, the raw data index, and the master list. This enables use of persistent fast search methods that only operate on fixed length records. This innovation of the present method allows application of the invention to virtually unlimited types of data, and virtually unlimited indexing organizations.

For example, to search the indexes by a signature 86 simply requires identifying the particular signature 86 desired within the partial index record. The partial index record reveals the key number 88 of the signature 86, and the count 90 which indicates the number of times a signature 86 occurs within the data stream. Additionally, a pointer 84 points to the location of the signature 86 within the combination cross-reference file. Upon location of the signature 86 within the combination cross-reference file a search quickly reveals all of the component item indicators 92 of the signature 86, and any related data 96 associated with the item indicators 92 of that particular signature 86. Further information about the signature 86 results by locating the signature 86 within the raw data index. In this manner, the search can reveal the location of every data entry record group with a particular signature 86. The indexing according to the present invention also allows supplemental searching based on subsets of the signature 86. For example, a search to reveal the occurrence of a single item 80 within any signature 86 would proceed according in the following manner. First, additional indexes are created. One of which, comprises an inverted combination cross-reference file (FIG. 4e). This file comprises the combination cross-reference index sorted by item indicator 92. Of course, those skilled in the art will realize that several other indexes can be created, and will be useful for specific search purposes. Next, the searcher will input the item 80, the minimal perfect hash function then creates the item indicator 92. Searches will proceed from the item indicator 92. For example, the item indicator 92 can locate the item 80 within the master list, through array subscripting. Furthermore, the item indicator 92 can identify the patterns of usage, by locating the signatures 86 which contain that item indicator 92 in the inverted combination cross-reference file. Additionally, in a similar manner, searches can proceed by re-ordering the partial index record by key number 88, or count 90.

Consequently, the indexing scheme of the present invention allows tremendous flexibility in structuring searches, and classifies the data in a manner to quickly retrieve information and data based on a nearly unlimited combination of search sort keys.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing form the scope of the invention. For example, the data entry record groups could represent software objects, or internal program stacks. This would enable computer operation system management using the indexing scheme of the present invention. Further the data indexing scheme of the present invention could apply to library indices. In the field of law, legal case reports often contain headnote classification systems. The data entry group could comprise the headnotes of a case, and the items would comprises the individual headnotes.

We claim:

1. A computerized method for organizational indexing, storage, and retrieval of computerized representations of events in the form of data, by creating signatures based upon the occurrence of patterns within the data, said method comprising the steps of:

a) reading a data entry record group representing an event, from a data stream, wherein said data entry record group comprises one or more data entry records wherein each of said data entry records has a key field containing an item;

b) tallying a key number representing a total number of said key fields in said data entry record group;

c) recording a marker to allow locating and determining the size of said data entry record group within said data stream;

d) creating an item indicator, wherein said item indicator represents a fixed length coded equivalence of said item;

e) repeating step d for each of said items of said data entry record group;

f) creating a signature, wherein said signature represents a fixed length coded equivalence of said item indicators of said data entry record group;

g) determining whether said signature has been previously created, and if said signature has not been previously created, then creating a partial index record comprising said signature and said key number;

h) updating a combination cross-reference file, wherein said combination cross-reference file comprises said signature of said data entry record group and said item indicators of said data entry record group;

i) repeating step h for each of said item indicators of said data entry record group; and j) updating a raw data index, wherein said raw data index comprises said signature of said data entry record group, and said marker.

2. The invention in accordance with claim 1 further comprising sorting said key fields of said data entry record group according to a predetermined sequence.

3. The invention in accordance with claim 2 further comprising a) determining if any of said key fields of said data entry record group duplicate;

b) deleting said duplicate key fields of said data entry record group; and c) reducing said key number by the number of said duplicates deleted.

4. The invention in accordance with claim 1 wherein said item indicator is created by applying a minimal perfect hash function to said item.

5. The invention in accordance with claim 1 wherein said signature is created by applying a signature function to said item indicators of said data entry record group.

6. The invention in accordance with claim 1 further comprising updating said combination cross-reference file with related data.

7. The invention in accordance with claim 1 further comprising repeating said steps of said method for a plurality of data entry record groups.

8. The invention in accordance with claim 7 wherein said partial index record further comprises a count representing the total number of data entry record groups with said signature.

9. The invention in accordance with claim 7 further comprising reading a master list, wherein said master list comprises a complete list of all possible items and wherein said associated item indicators serve as array subscripts of said master list.

10. The invention in accordance with claim 7 further comprising creating a master list wherein said master list comprises a complete list of all possible items and wherein said associated item indicators serve as array subscripts of said master list.

11. The invention in accordance with claim 1 wherein said partial index record further comprises a pointer to said combination cross-reference file.

12. The invention in accordance with claim 1 wherein said signature and a location of said signature in said partial index record are made available for use by a fast search method.

13. The invention in accordance with claim 1 further comprising creating an inverted combination cross-reference file, whereby said item indicators of said combination cross reference file are sorted into a predetermined order.

14. The invention in accordance with claim 1 wherein said signature is created by applying a signature function to said items of said data entry record group.

15. A computerized method for organizational indexing, storage, and retrieval of computerized representations of events in the form of data, by creating signatures based upon the occurrence of patterns within the data, said method comprising the steps of:

a) reading a data entry record group representing an event from a data stream, wherein said data entry record group comprises one or more data entry records wherein each of said data entry records has a key field containing an item;

b) tallying a key number representing a total number of said key fields in said data entry record group;

c) sorting said key fields of said data entry record group according to a predetermined sequence, deleting any duplicate key fields, and reducing said key number by the number of said duplicates deleted;

d) recording a marker to allow locating and determining the size of said data entry record group within said data stream;

e) creating an item indicator, wherein said item indicator represents a fixed length coded equivalence of said item by applying a minimal perfect hash function to said item;

f) repeating step d for each of said items of said data entry record group;

g) creating a signature, wherein said signature represents a fixed length coded equivalence of said item indicators of said data entry record group by applying a signature function to said item indicators;

h) determining whether said signature has been previously created, and if said signature has not been previously created, then creating a partial index record comprising said signature, said key number, a pointer to a combination cross-reference file, and a count representing the total number of data entry record groups with said signature, if said signature has been previously created then updating said count;

i) updating said combination cross-reference file, wherein said combination cross-reference file comprises said signature of said data entry record group and an item indicator of said data entry record group;

j) repeating step h for each of said item indicators of said data entry record group;

k) updating a raw data index, wherein said raw data index comprises said signature of said data entry record group, and said marker;

l) making said signature and a location of said signature in said partial index record available for use by a fast search method; and m) repeating steps a through l for a plurality of data entry record groups.

16. A computer readable memory for organizational indexing, storage, and retrieval of computerized representations of events in the form of data, by creating signatures based upon the occurrence of patterns within the data, said memory comprising:

a) a computer controlled program means for reading a data entry record group representing an event from a data stream, wherein said data entry record group comprises one or more data entry records wherein each of said data entry records has a key field containing an item;

b) a computer controlled program means for tallying a key number representing a total number of said key fields in said data entry record group;

c) a computer controlled program means for sorting said key fields of said data entry record group according to a predetermined sequence, deleting any duplicate key fields, and reducing said key number by the number of said duplicates deleted;

d) a computer controlled program means for recording a marker to allow locating and determining the size of said data entry record group within said data stream;

e) a computer controlled program means for creating an item indicator, wherein said item indicator represents a fixed length coded equivalence of said item by applying a minimal perfect hash function to said item;

f) a computer controlled program means for repeating step d for each of said items of said data entry record group;

g) a computer controlled program means for creating a signature, wherein said signature represents a fixed length coded equivalence of said item indicators of said data entry record group by applying a signature function to said item indicators;

h) a computer controlled program means for determining whether said signature has been previously created, and if said signature has not been previously created, then creating a partial index record comprising said signature, said key number, a pointer to a combination cross-reference file, and a count representing the total number of data entry record groups with said signature, if said signature has been previously created then updating said count;

i) a computer controlled program means for updating said combination cross-reference file, wherein said combination cross-reference file comprises said signature of said data entry record group and an item indicator of said data entry record group;

j) a computer controlled program means for repeating step h for each of said item indicators of said data entry record group;

k) a computer controlled program means for updating a raw data index, wherein said raw data index comprises said signature of said data entry record group, and said marker;

l) a computer controlled program means for making said signature and a location of said signature in said partial index record available for use by a fast search method; and m) a computer controlled program means for repeating steps a through l for a plurality of data entry record groups.

* * * * *